UNITED STATES PATENT OFFICE.

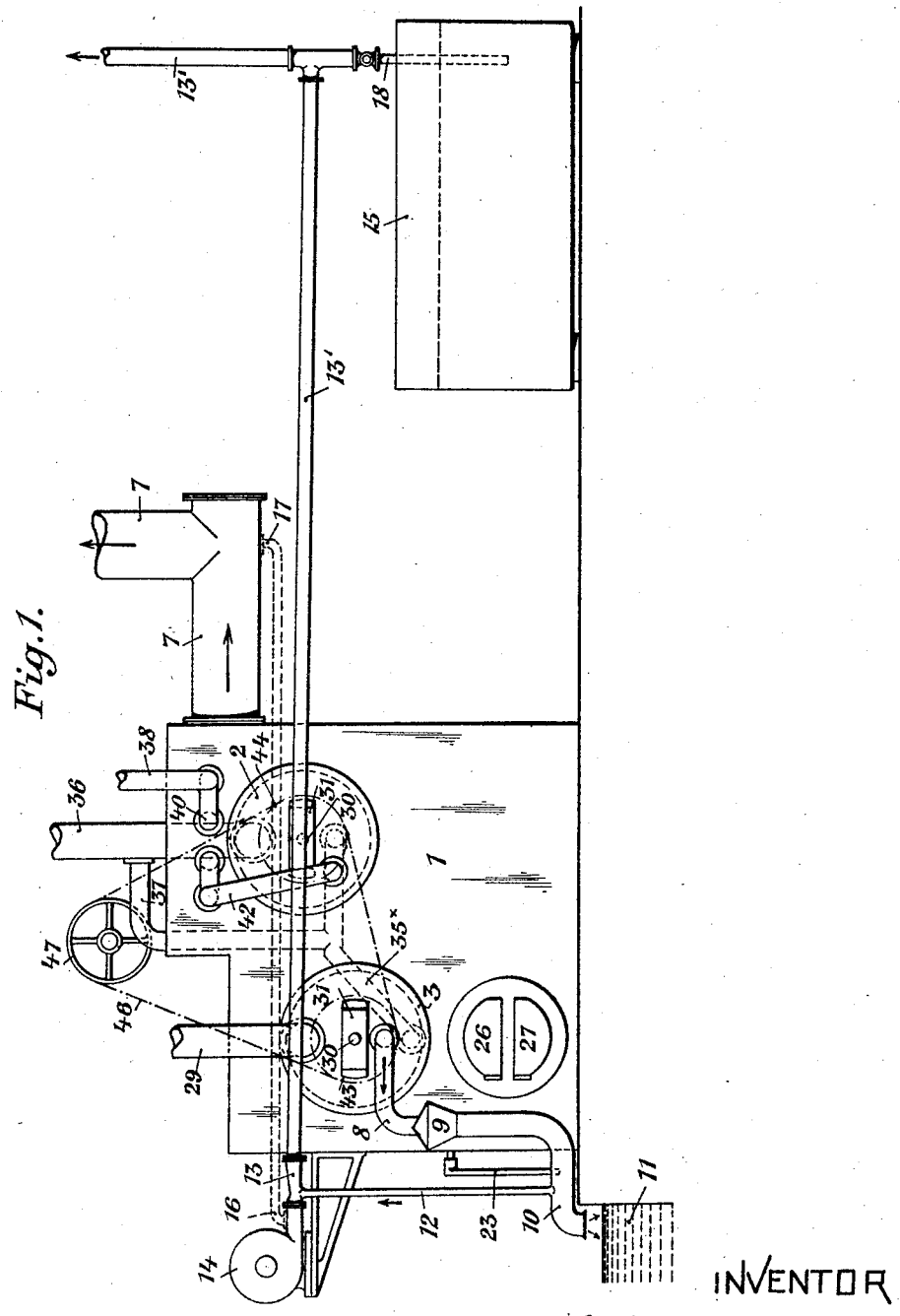

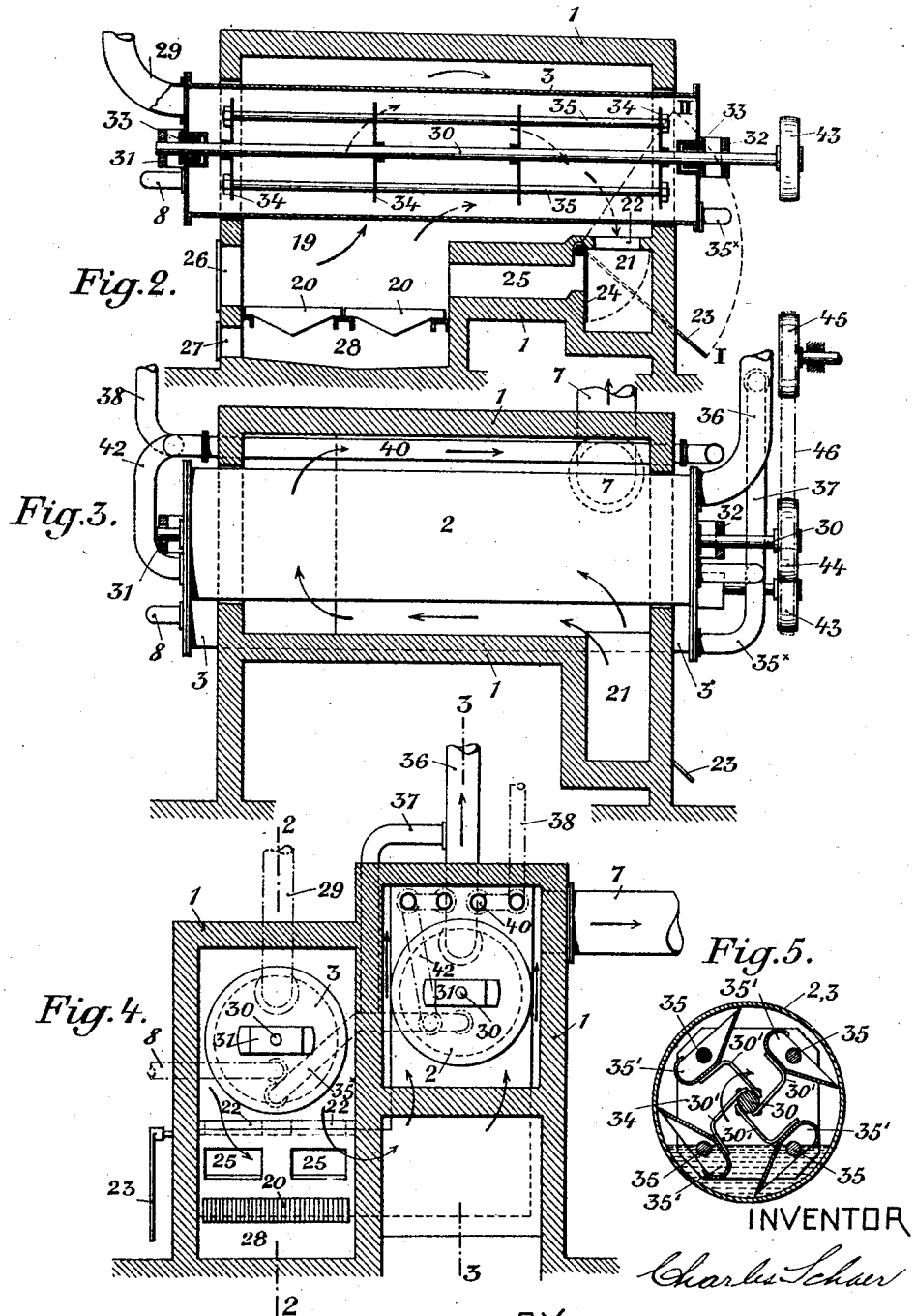

CHARLES SCHAER, OF LANGENTHAL, SWITZERLAND.

PLANT AND PROCESS FOR DISTILLING TAR.

1,415,056.   Specification of Letters Patent.   Patented May 9, 1922.

Application filed April 23, 1917. Serial No. 163,985.

*To all whom it may concern:*

Be it known that I, CHARLES SCHAER, engineer, a subject of Switzerland, residing at and whose post-office address is Langenthal, Switzerland, have invented certain new and useful Improvements in Plants and Processes for Distilling Tar, (for which I have filed applications in Germany on March 15, 1916; in France on February 17, 1917; in Italy on January 22, 1917; in Spain on January 16, 1917; in Austria on January 17, 1917; in Hungary on January 24, 1917; in Belgium on February 3 and 8, 1917, and in Holland on February 5, 1917;) and I do hereby declare the following to be a full, clear, and exact description of the invention, such as will enable others skilled in the art to which it appertains to make and use the same.

My invention relates to plants and processes for distilling tar in uninterrupted service, and more especially to plants comprising a plurality of stills heated directly from without. The particular object of the invention resides in the provision of means, connected with a distilling plant of this kind, for ensuring a specially advantageous heating of the stills and a suitable conduction of the vapors. I preferably arrange within the stills a number of revolving ladles continuously supplying the entire heated inner surface of the still with tar from the bottom of the still, the said tar being then scraped off again.

In the drawings affixed to this specification and forming part thereof

Fig. 1 is a front view of a plant comprising two drum shaped stills.

Figs. 2 and 3 are vertical longitudinal sections on the lines 2—2 and 3—3 respectively of Fig. 4, Fig. 4 is a cross-section of the stills and furnace shown in Fig. 1, and Fig. 5 is a cross-section of one of the stills.

Referring to the drawings, 1 is the furnace and 2 and 3 are the stills embedded in the masonry. The tar passes continuously through the feed pipe 38, the spiral pipes of the preheater 40 and the pipe 42 into the still 2, where the light oil and the ammonia water is evaporated. The pipe 36 conducts these vapors to a condenser (not shown), while the tar freed from the light oil and the ammonia water passes through a pipe 35× into the still 3. In case that in passing vapors should be generated, they will pass into the pipe 36 by way of pipe 37. The still 3 is heated to a higher degree and is placed at a lower level than still 2. In the still 3 the distillation is carried to an end. The pipe 29 carries the vapors escaping from still 3 into another condensing apparatus (not shown). The residual pitch flows off continuously through pipe 8 in immediate vicinity to the most strongly heated part of the still. The pitch is caught in a funnel 9 and passes through the conduit 10 into the pit 11 (Fig. 1).

1 is the furnace as a whole, 20 is the grate, 26 the coaling door, 27 the ash pit door, 28 the ash pit. The fire gases are conducted in a counter-current to the tar, as shown by the arrows and after having heated the still 3 pass through apertures 22 and a channel 21 below still 2 and after having heated this latter escape through the stack 7. Below still 3 there are arranged two flues 25 for controlling the fire gases, said flues being adapted to be opened or closed by aid of a flap valve 24 provided with a handle 23. When said handle is in the position I (Fig. 2), the flues are closed and the fire gases pass around the still 3 as shown by the arrows. In the case however where the handle 23 assumes the position II, the valve 24 closes the openings 22 and the fire gases are then forced to pass through the flues 25 so as to be prevented from reaching the still 3. Whenever the handle is set in an intermediate position, the openings 22 as well as the flues 25 are partly open, and in consequence thereof part of the gases passes through the openings 22 and the rest through the flues 25, the relative quantities being predetermined by the position of the valve.

In order to catch the vapors escaping at the place where the pitch leaves the furnace, to condense and to carry them back to a reservoir 15 a blower and an ejector fed with compressed air by said blower are arranged in such a fashion that the mouth of the suction pipe of the ejector is placed near the place where the pitch escapes, the exhaust pipe 13′ of the ejector being arranged to condense the vapors formed therein and to collect the condensates. As shown in Fig. 1, the blower 14 feeds the ejector 13 having its suction pipe 12 connected to the pitch channel 10, this latter being arranged pass the pitch at a low velocity and with a great surface. The ejector 13 draws all pitch vapors through pipe 12 and carries them on through the exhaust pipe $13^1$. There the vapors being cooled are condensed and can be tapped through pipe 18 into the reservoir 15, while the compressed air from the ejector escapes from the pipe 13¹ upwards.

Preferably one or a plurality of ejectors are provided for creating an artificial draught for the heating of the stills, said ejectors being fed also by the blower 14, this modification being shown in Fig. 1 in dotted lines. To the pressure pipe of the blower a branch pipe 16 is connected which feeds an ejector arranged in the stack 7 at 17 and creating a suction draught in the furnace 19.

In the embodiment shown in the drawings the stills are provided with revolving ladles driven from a transmission gear 45 by aid of a belt 46 and pulleys 43, 44. The revolving ladle shaft 30 is located in bearings 31, 32 (Fig. 2), stuffing boxes 33 being provided in the front and rear walls of the still. Within the still there are disposed on shaft 30 four plate discs 34 carrying rods 35 and revolving in the direction of the arrows (Fig 5). The rods 35 carry ladles 35¹ rotatably fastened to them, said ladles being pressed against the wall of the still by aid of springs 30¹. Each ladle carries along some tar from the bottom of the still and in revolving deposits it on the wall. The ladle next following removes the tar thus deposited and replaces it by a fresh portion of tar. As shown in the drawings the ladles supply substantially the entire annular heated surface of the wall of the still.

Subject-matter shown and described but not claimed herein is included in my copending application Serial No. 384,701, filed May 27, 1920, as a continuation and division of this application.

I claim:—

1. In a tar distillation plant, a heating compartment, a cylindrical still mounted therein, means for conveying tar to and from the still, and means for spreading the tar in a layer over the interior surface of the still, said means comprising a plurality of ladles, a rotary support within the still on which said ladles are mounted with their discharge ends in close proximity to the walls of the still, and means for rotating said support.

2. In a tar distillation plant, a heating compartment, a cylindrical still in said compartment, means for conveying tar to and from the still, means for successively spreading and removing a layer of tar over the interior surface of the still, said spreading and removing means consisting of a plurality of ladles, a rotary support on which said ladles are mounted and means for pressing the advancing edges of the ladles against the wall of the still to remove the layer deposited by the preceding ladle.

3. In a tar distillation plant, a still, means to circulate heating gases around said still, a plurality of spreading devices mounted to move within said still against the inner walls thereof and through the tar contained therein, said spreading devices provided with scraping means for removing the tar spread on the walls of the still by the spreading devices, and means for actuating said spreading and scraping devices.

4. In a tar distillation plant comprising a still and means for circulating heating gases around the exterior walls thereof, a series of combined spreading, scraping and stirring devices mounted to move within said still over the inner walls thereof, each of said devices having a ladle portion for lifting the tar and distributing it on the wall of the still and a scraper portion for removing the tar distributed by the preceding device, and means for actuating said devices.

5. In a tar distillation plant comprising a cylindrical still and means to circulate heating gases around the exterior of said still, means for alternately spreading and removing a layer of tar over the interior surface of the heated walls of the still, said means comprising a shaft within the still, a plurality of supports mounted at intervals along said shaft, a plurality of ladle devices pivotally mounted on each of said supports adjacent the wall of the still, resilient means for maintaining said ladle devices against the wall of the still, the advancing portion of each ladle device formed as a scraper for removing the tar spread on the wall by the preceding ladle, and means to rotate said shaft.

6. The process of distilling tar which consists in subjecting a body of tar to heat in an exteriorly heated still, continuously stirring the tar while subjecting the same to heat, and continuously alternately spreading the tar in a layer over the heated wall of the still and removing the same therefrom.

In testimony whereof he affixes signature.

CHARLES SCHAER.